(12) United States Patent
Bureacov

(10) Patent No.: US 10,598,883 B1
(45) Date of Patent: Mar. 24, 2020

(54) LANYARD ORGANIZING TOOL FOR CABLE ASSEMBLY

(71) Applicant: AFL IG LLC, Kent, WA (US)

(72) Inventor: Artur Bureacov, Tacoma, WA (US)

(73) Assignee: AFL IG LLC, Kent, WA (US)

(*) Notice: Subject to any disclaimer, the term of this patent is extended or adjusted under 35 U.S.C. 154(b) by 0 days.

(21) Appl. No.: 16/223,066

(22) Filed: Dec. 17, 2018

Related U.S. Application Data

(60) Provisional application No. 62/599,543, filed on Dec. 15, 2017.

(51) Int. Cl.
G02B 6/44 (2006.01)
H02G 15/04 (2006.01)
F16C 1/26 (2006.01)
H02G 11/00 (2006.01)

(52) U.S. Cl.
CPC ............ G02B 6/4439 (2013.01); F16C 1/262 (2013.01); H02G 15/043 (2013.01); H02G 11/00 (2013.01)

(58) Field of Classification Search
CPC .. H02G 15/043; G02B 6/4439; G02B 6/3879; G02B 6/3849; G02B 6/3825; G02B 6/4465; H01R 13/518; H01R 13/52; H01R 13/447; H01R 13/5213; B60D 1/605; F16G 11/025
USPC ............... 174/72 A; 248/74.2; 385/134, 139; 224/578
See application file for complete search history.

(56) References Cited

U.S. PATENT DOCUMENTS

| | | | | |
|---|---|---|---|---|
| 6,227,717 B1* | 5/2001 | Ott | ........................ | G02B 6/3849 385/134 |
| 6,736,548 B2* | 5/2004 | Tanaka | .................. | G02B 6/3849 385/139 |
| 7,583,883 B2* | 9/2009 | Kowalczyk | .......... | G02B 6/3849 385/134 |
| 2008/0273855 A1* | 11/2008 | Bradley | ............... | G02B 6/3849 385/139 |
| 2009/0080849 A1* | 3/2009 | Hankins | ............... | G02B 6/3897 385/135 |
| 2010/0129043 A1* | 5/2010 | Cooke | .................. | G02B 6/3849 385/139 |
| 2011/0013876 A1* | 1/2011 | Marcouiller | ......... | G02B 6/3849 385/139 |
| 2012/0281951 A1* | 11/2012 | Takahashi | ............ | G02B 6/3846 385/80 |

* cited by examiner

Primary Examiner — Roshn K Varghese
(74) Attorney, Agent, or Firm — DWC Law Firm, P.S.

(57) ABSTRACT

In some embodiments, a lanyard organizing tool is provided comprising a plurality of retainer dust caps connected to an organizing chord, with reach retainer dust cap being releasably connectable to a terminating connector of a fiber optic cable. The retainer dust caps may be formed with release components that can be manually squeezed, or depressed, by an operator using one hand to release a connector from the chord conveniently, in order to connect the connector to an intended receiving port. Methods of using the lanyard organizing tool are also provided.

9 Claims, 6 Drawing Sheets

LANYARD ORGANIZING TOOL FOR CABLE ASSEMBLY

CROSS REFERENCE TO RELATED APPLICATION(S)

This application claims the benefit of U.S. provisional patent application No. 62/599,543, filed on Dec. 15, 2017, which is incorporated herein by reference in its entirety.

BACKGROUND

1. Technical Field

The present disclosure relates to tools for use in organizing communications cables for efficient assembly of networks.

2. Description of Related Art

Modern electronic/computer networks often employ fiber optic cables to interconnect systems that may be spatially or geographically dispersed. A trunkline is a type of fiber optic cable that typically includes multiple optic fibers and strength filaments arranged lengthwise and encased in a protective jacket (e.g., plastic or metal tubing). At each end of a trunkline, the optic fibers of the trunkline are commonly furcated into a plurality of smaller individual cables via a breakout assembly (or cable harness), wherein the smaller individual cables may each house one or more fibers (e.g., two, three, and so forth), with each smaller individual cable terminating to an individual connector (e.g., such as, for example, an MPO, LC, or SC connector etc.).

During network assembly and/or maintenance, the individual connectors will need to be connected to appropriate communication ports by operators of a network. Normally, in a breakout assembly, individual cables (with their terminating connectors) are generally loosely bundled together and labeled for identification before use in a communications network. However, given the extremely large volume of connectors involved that need to be connected, matching individual cables to the proper ports is often a very time-consuming and inefficient task.

BRIEF SUMMARY

In some embodiments, a lanyard organizing tool for organizing fiber optic cables comprises a chord member and a plurality of retainer dust caps attached to the chord member, the retainer dust caps each being releasably connectable to a terminating connector for a fiber optic cable.

The retainer dust caps can each include an aperture through which the chord member is passed. Also, in some embodiments, the retainer dust caps can each include a release component which is resilient and compressible to release a terminating connector releasably connected thereto. The release component is accessible on opposite sides of the retainer dust cap, or a pair of release components is provided with one release component disposed on each of opposite sides of the retainer dust cap, whereby a user can squeeze the release component or pair of release components simultaneously on opposite sides of the retainer dust cap.

In some embodiments, the release component includes a least one wedge member having a sloped acting surface configured to exert a rearward force component against a housing of a terminating connector releasably connected to the retainer dust cap when the release component is compressed. The sloped acting surface can be inwardly forwardly sloped.

In some embodiments of the present disclosure, a fiber optic cable assembly comprises a plurality of fiber optic cables each being terminated by a terminating connector, with each of the terminating connectors being connected to a chord by a retaining member connected to the terminating connectors. The terminating connectors can be releasably connected to the retaining members. Also, the retaining members can each be formed on a corresponding retainer dust cap for use in protecting the terminating connectors from contaminants and/or damage. A resilient release component can be disposed on opposite sides of each of the retainer dust caps or a pair of resilient release components can be disposed on opposite sides of each of the retainer dust cap.

In some embodiments of the present disclosure, methods are provided for organizing a fiber optic cable assembly. The methods can comprise releasably connecting a plurality of terminating connectors for fiber optic cables to a corresponding plurality of retaining members, the retaining members each being coupled to an organizing chord; and releasing the terminating connectors from the retaining members in order to attach the terminating connectors to corresponding receiving ports in a network system. Also, in some embodiments, the retaining members are formed on a retainer dust cap for use in protecting the terminating connectors from dust or other contaminates, and wherein releasing the terminating connectors comprises squeezing together one or more release components, disposed on opposite sides of a housing of the terminating connector.

DETAILED DESCRIPTION

In the present description, certain specific details are set forth in order to provide a thorough understanding of various embodiments of the disclosure. However, upon reviewing this disclosure one skilled in the art will understand that the various embodiments disclosed herein may be practiced without many of these details. In other instances, some well-known structures and materials of construction have not been described in detail to avoid unnecessarily obscuring the descriptions of the embodiments of the disclosure.

In the present disclosure, to the extent the terms "about" and "approximately," are used, they mean±20% of the indicated range, value, or structure, unless otherwise indicated. In the present description, the terms "a" and "an" as used herein refer to "one or more" of the enumerated components. The use of the alternative (e.g., "or") should be understood to mean either one, both, or any combination thereof of the alternatives. As used herein, the terms "include" and "comprise" are used synonymously, the terms and variants of which are intended to be construed as non-limiting. The definitions in this paragraph are intended to apply throughout this disclosure unless otherwise expressly stated.

In various embodiments of the present disclosure, a lanyard organizing tool is provided for organizing loose cable lines and their terminating connectors to facilitate efficient mating of the connectors to intended receiving ports.

Figure 1:
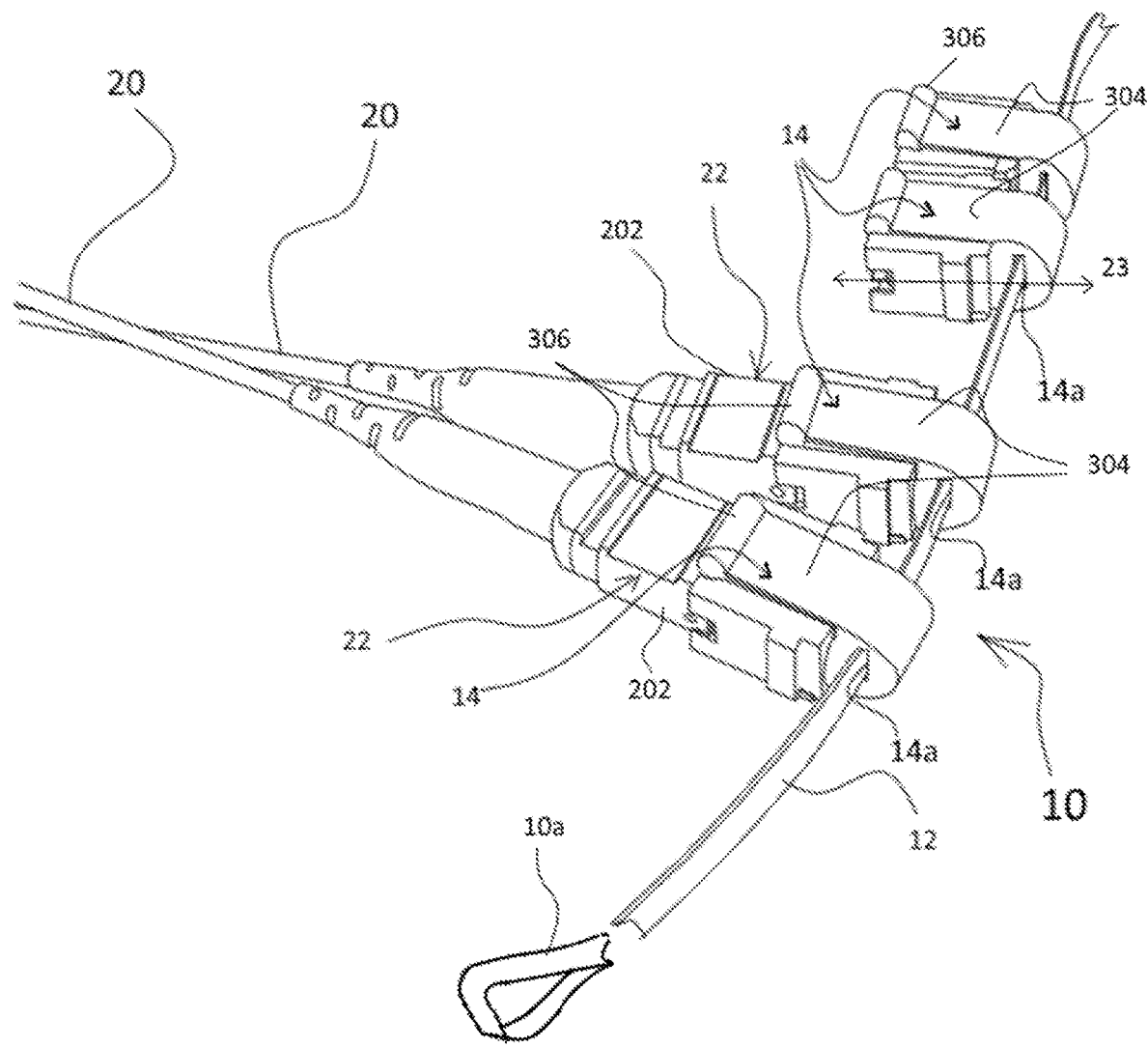
FIG. 1 is a perspective of an embodiment of the lanyard organizing tool with retainer dust caps and chord for some embodiments of the present disclosure, with two of the retainer dust caps being connected to cables via terminating connectors as part of a cable assembly, and two of the retainer dust caps not being connected (for illustrative purposes).

FIG. 1 illustrates an example lanyard organizing tool 10 of the present disclosure. The lanyard organizing tool 10 may include a plurality of retainer dust caps 14 and a chord 12. The retainer dust caps may include a retainer member 14a, such as a slot or other aperture formed therethrough, for retaining the retainer dust cap 14 to the chord. The term slot, as used herein, may also refer to apertures of different shapes or sizes, for use in receiving a chord 12 of the lanyard organizing tool, and unless the context indicates otherwise, the terms "slot" or "slotted" are not intended to limit the shape of such aperture. The retainer dust cap 14 may releasably connected to a connector 22 in a manner to protect fiber connectors from contaminates and/or damage, as will be appreciated by those skilled in the art after reviewing the present disclosure, and thereafter, retain the connector 22 and cable 20 to the chord 12 for organization. In some embodiments, the retainer member 14a on the retainer dust cap is a slot or other aperture through which a chord 12 is passed to hold the retainer dust cap 13 to chord 12 (e.g., flexible string, strip, wire, or any elongated member). The slot may be an aperture of any suitable shape. In some embodiments, each of a plurality of retainer dust caps 14 retained on the chord 12 of the organizing tool 10 is configured to receive and releasably retain connectors 22 of fiber optic cables 20 of a breakout assembly, patch assembly, etc. (also collectively referred to herein as a "cable assembly").

It is also noted that in other embodiments, rather than a slot (or other aperture) for retaining the retainer dust cap 14 on a chord 12 of the lanyard tool, different forms of retainer members 14a may be used, such as, for example, without limitation, any of a variety of attachment structures. Examples may include a permanently formed connection between each of the retainer dust caps 14 and the chord 12 at spaced apart locations thereon, or in other embodiments, the chord 12 can be formed or connected to hooks formed thereon at spaced apart locations and the retainer dust caps 14 can have receptacles for receiving the hooks, etc. Alternatively, in some embodiments, the retainer dust caps may be formed on the chord in side by side space-apart fashion thereon.

Figure 2A:
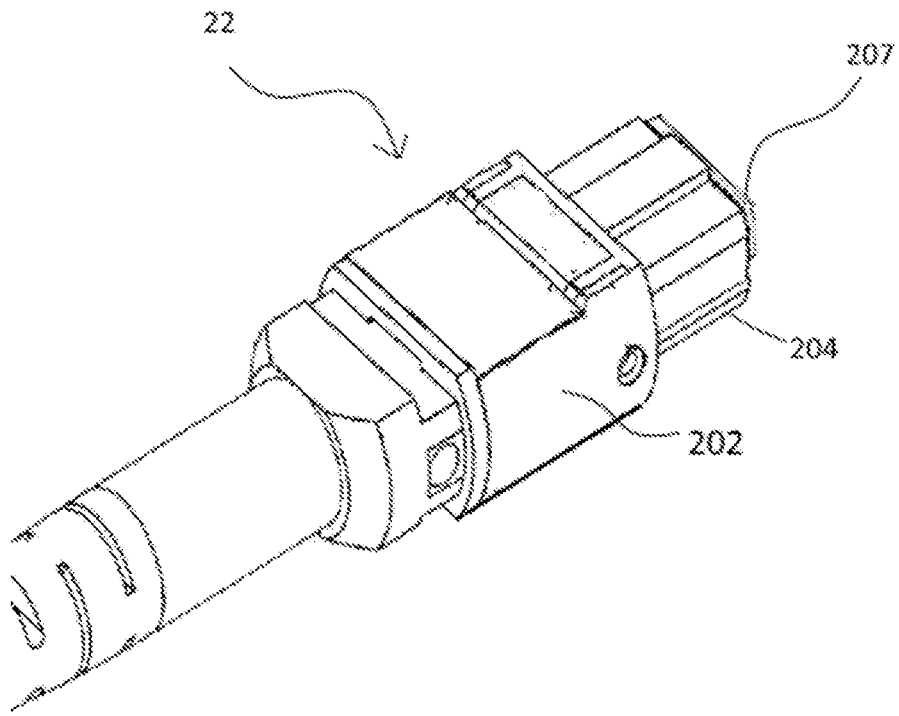
FIG. 2A is perspective view of a prior art connector with the housing positioned in a resting state with a spring of the connector biasing the housing forward.
Figure 2B:
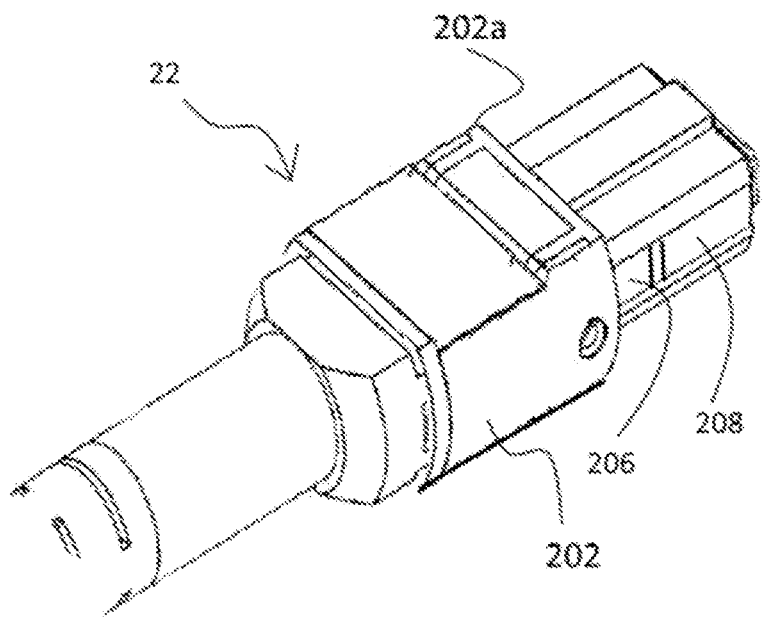
FIG. 2B is perspective view of the prior art connector of FIG. 2A, with the housing being urged and retained rearward to expose a notch for use in connecting the connector to a retainer dust cap of the present disclosure.

The prior art connectors 22 illustrated in FIG. 1, and FIGS. 2A and 2B, by way of example, are MPO connectors, but may be other types of connectors in other embodiments, as will be appreciated by those skilled in the art after reviewing this disclosure. Also, as will be further described herein, the retainer dust caps 14 of the present disclosure may permit quick release of attached connectors 22, which quick release may be accomplished by a user using only one hand, providing a high level of efficiency and convenience during installations.

Still referring to FIG. 1, in some embodiments of the present disclosure, the cables 20 of a cable assembly may be pre-arranged on the organizing tool 10, by connecting individual connectors 22 of the cables to the retainer dust caps 14 of the organizing tool 10, in a pre-selected order of arrangement that is determined by an assembling party. The pre-selected order is optimized to be efficient for a user in the field, namely, in the network equipment facility. Such determination may be based on user knowledge of installation configuration for an anticipated user/operator, as will be appreciated by those skilled in the art after reviewing this disclosure. Moreover, in some embodiments, retainer dust caps 14 may themselves be labeled for identification, and/or color coded for organizational assistance during use.

For example, in some embodiments, a cable installer or operator assigned to interconnect the fiber optic cables 20 of a harness or other assembly ("cable assembly"), may typically have a list/chart of, or may otherwise be informed of, the connections that need to be established between each individual cable 20 of the cable assembly and individual corresponding ports in a network/system. In conventional settings, the cables 20 can be labeled with notations that provide information regarding their destination ports; however, the cables 20 can be numerous within a cable assembly and inefficient to locate. By contrast, when the cables 20 have been pre-arranged on the organizing tool 10 of the present disclosure, the installer may release the individual connectors 22 from each of the slotted dust cap assemblies 14, in an order that has been preselected for convenient installation and moreover, the separation of the cables 20 (as opposed to being entangled or otherwise intertwined or mixed) by being hung on the organizing tool 10, and labeled thereon, can also provide for efficient locating/identification of the individual cables 20 during installation. That is, a user can carry (hold or hang) the lanyard organizing tool 10 while engaging in cable installation of the cable assembly in a network.

FIGS. 2A &2B illustrate detail views of one of the prior art connectors 22 of FIG. 1. As described above connector 22 is an MPO connector (in particular, an MTP® MPO connector) with a connector housing 202 and a connector sub-assembly 204. In FIG. 2A, the housing 202 is in a resting state, with a spring of the connector (not illustrated)

urging the connector 22 housing 202 forward in a direction toward the mating end 207 of the connector 22 (e.g., right side in FIG. 2A). When a user presses the mating end portion of connector 22 into a retainer dust cap 14 (see e.g., FIG. 3A, enlarged view of dust cap 14) of the present disclosure, the connector housing 202 will abut against a portion of dust cap 14 and is urged rearward against the spring of the connector (to the left as illustrated in FIG. 2B) to expose notches 206 on left and right sidewalls 208 of the connector sub-assembly 204. Releasable locking retainer dust cap components 302 (FIG. 3) disposed on both sides of the retainer dust cap 14, can then snap inward into the notches 206, allowing the spring to again bias the connector housing 202 forward over the locking dust cap components 302 to releasably hold them against the connector sub-assembly 202 and releasably secure the retain dust cap 14 to the connector 22, as can be seen in FIG. 1.

Figure 3A:
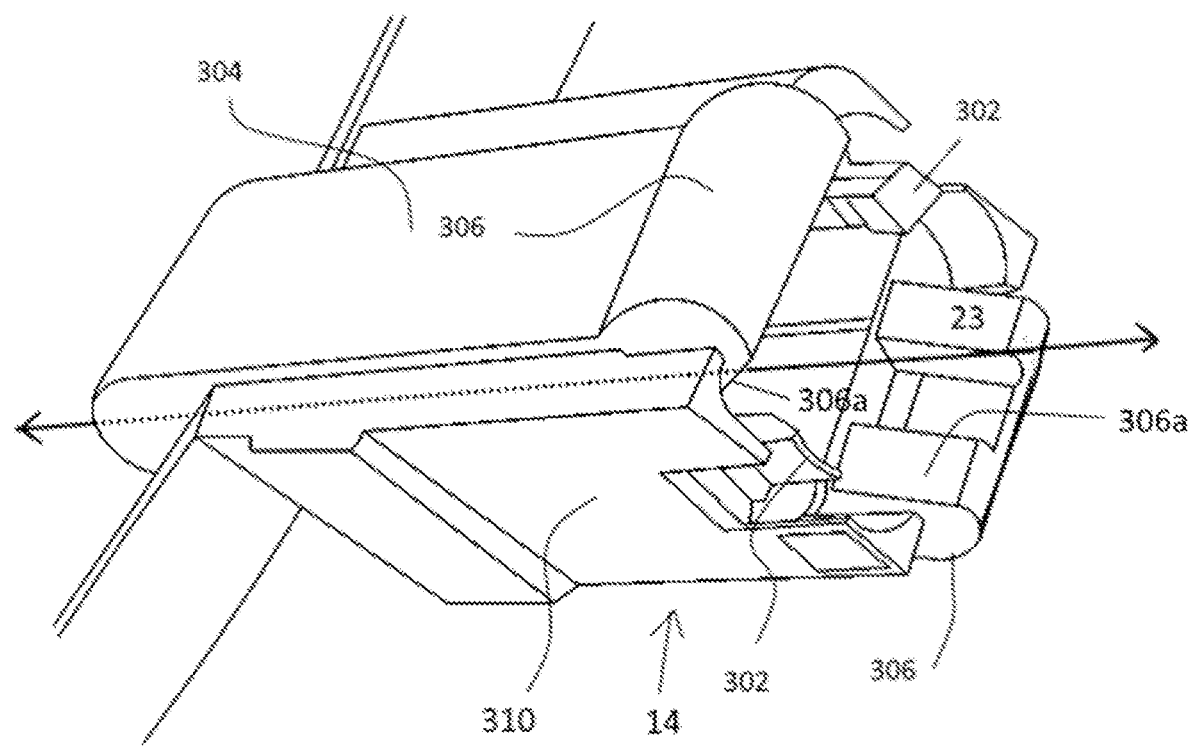
FIG. 3A is an enlarged rear perspective view of a retainer dust cap of the present disclosure, such as a retainer dust cap as shown in FIG. 1.
Figure 3B:
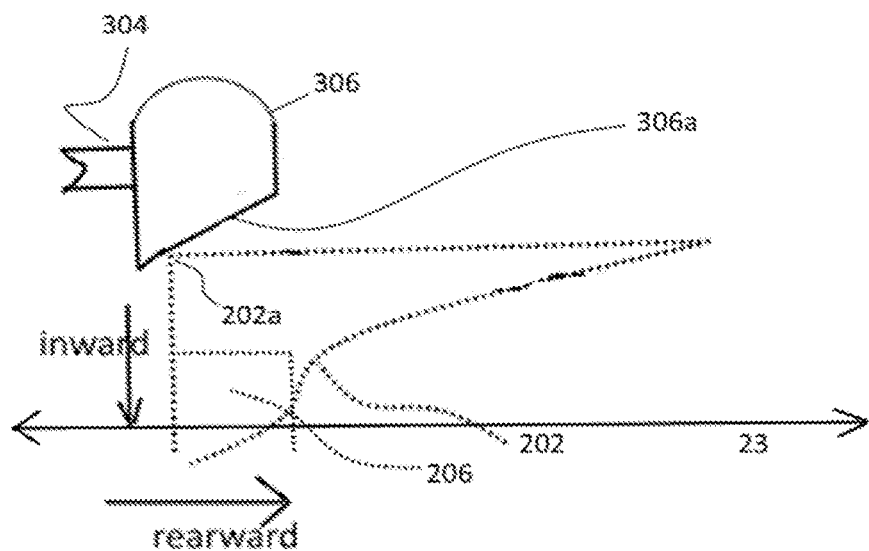
FIG. 3B is simplified partial side view of a retainer dust cap of FIG. 1, connected to a terminating connector, showing the upper wedge component of the retainer dust cap, with a sidewall of the retain dust cap omitted to show the housing interaction with the sloped acting surface of the wedge component of the retainer dust cap.
Figure 3C:
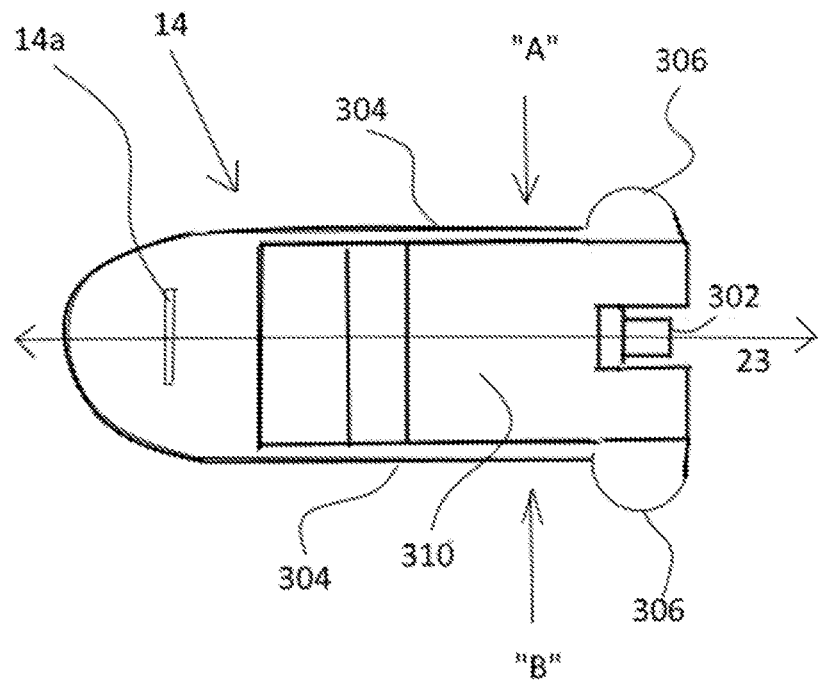
FIG. 3C is a side elevation view of the retainer dust cap of FIG. 3A.

Referring to FIGS. 3A, 3C (and FIG. 1), in some embodiments, the retainer dust cap 14 structure may be symmetrical, or substantially symmetrical, about a longitudinal axis 23—that is, an upper portion structure and lower portion structure of the retainer dust cap 14, above axis 23 and below axis 23, may be substantially the same structure, but with opposite orientation, and a left portion structure and right portion structure, left of axis 23 and right of axis 23, may be substantially the same structure, but with opposite orientation.

Referring to FIGS. 3A-3C, and FIG. 1, when the connector 22 is connected to the retainer dust cap 14, as shown in FIG. 1, and releasably locked thereto as described above, a connector release component 304 of the retainer dust cap 14, having upper and lower wedge members 306, may be manually compressed (e.g., squeezed) to release the connector 22 from the retainer dust cap 14. That is, for example, as can be seen in FIG. 3B, showing a simplified partial view of an upper wedge member 306 portion formed on a resilient release component 304 of the retainer dust cap 14 (without showing the retainer dust cap sidewall 310 of FIGS. 3A and 3C), in some embodiments, the wedge members 306 longitudinally extend to a rearward edge portion (i.e., closest to an incoming connector 22) of the retainer dust cap 14 facing the connector housing 202, and each wedge member 306 has an inwardly disposed sloped acting surface 306a, the sloped acting surface 306a configured to dip, or slope, inwardly forwardly (away from the connector housing), and to abut against a forward edge 202a of the connector housing 202, when the connector 22 is connected to the retainer dust cap 14. As such, when the resilient connector release component 304 (which can have spring characteristic), which is illustrated in a resting position in FIGS. 3A-3C, is compressed (e.g., squeezed from above and below as shown in FIG. 3C as arrows "A" and "B"), the sloped acting surfaces 306a on the opposite upper and lower wedges 306 are urged inward, and in turn, exert a component of force longitudinally rearward (as well as inward) against a forward edge 202a of the connector housing 202, thus urging the connector housing 202 rearward to expose the notches 206 (described above) so that the locking dust cap components 302 of the retainer dust cap 14 can be released from the connector 22 and further urging the connector housing 202 rearward sufficiently to release the connector 22 entirely from the retainer dust cap 14, and in some embodiments, to push the connector from the retainer dust cap 14.

As such, when a user is holding the lanyard organizing tool 10 during cable installation, the user can release individual cables 20 from the tool using one hand by squeezing the release component 304 between, for example, a forefinger and thumb. In some embodiments, the user can hang the organizing tool 10 by a loop 10a at an end portion therefore (e.g., See, FIG. 1) to an object proximate a work location, and then using one hand to release the cables 20 by manually squeezing the release component 304 between thumb and finger, while using another hand to install the cables.

Figure 4:
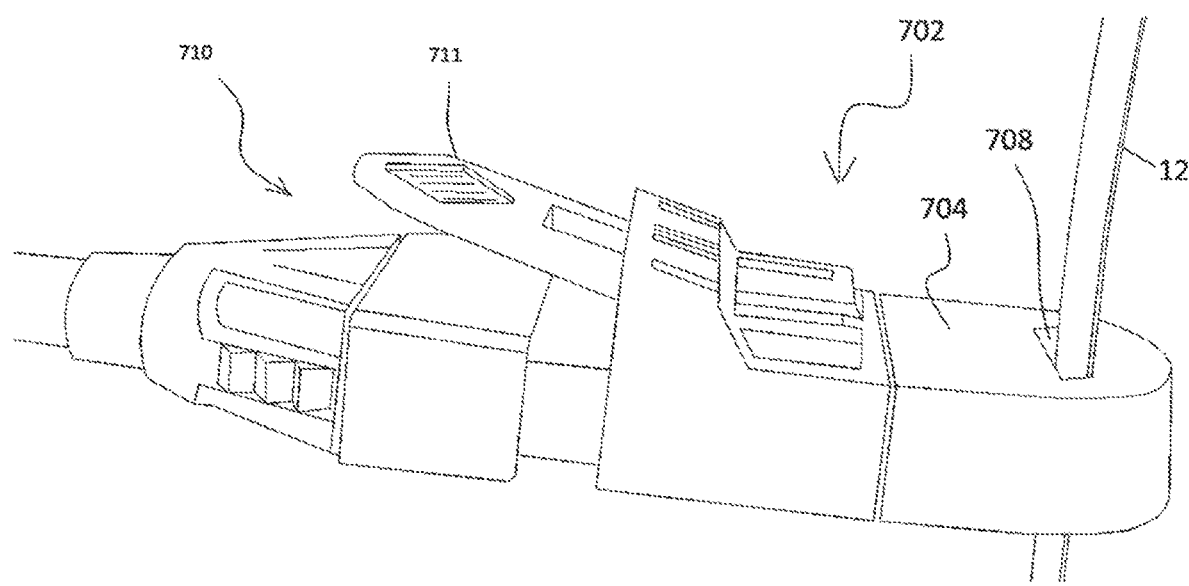
FIG. 4 is an alternative embodiment of a retainer dust cap as connected to a chord, and releasably connected to a terminating connector for a fiber optic cable, as part of an alternative lanyard organizing tool and cable assembly of the present disclosure, which may comprise multiple such retainer dust caps connected to the chord.

FIG. 4 shows an alternative embodiment of the present disclosure, configured for an LC connector type. Similar to the embodiment described above for the MPO connector, the LC connector embodiment can also comprise a plurality of retainer dust caps 702 (which can again, include apertures 708 which serve as retainer members), so that the retainer dust cap 702 can be attached to a chord 12 threaded through the retainer member 708, to form a lanyard organizing tool similar to that described above for cable assembly, but with each retainer dust cap 702 being configured to releasably retain an LC connector. In some embodiments, the connector 710 can be releasably connected and released from the retainer dust cap 702 by mechanism similar to how the connector 710 connects to a port, namely, that a user can depress a release tab 711 to release the connector 710 from the retainer dust cap 702.

Moreover, as will be appreciated by those skilled in the art after reviewing this disclosure, it is contemplated in the present disclosure that similar lanyard organizing tools as disclosed herein may be configured for use with any of a variety of connectors of different types and/or configurations.

Figure 5A:
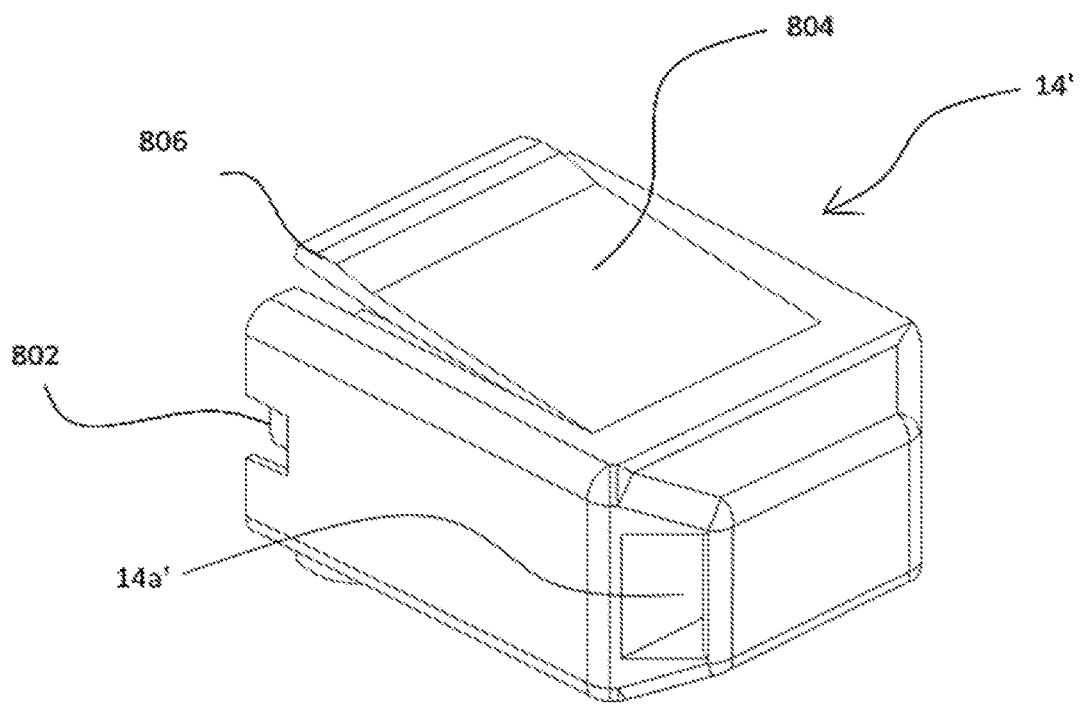
FIG. 5A is front perspective view of an alternative embodiment of a retainer dust cap of the present disclosure, in which the retainer dust cap is an integrally formed retainer dust cap.
Figure 5B:
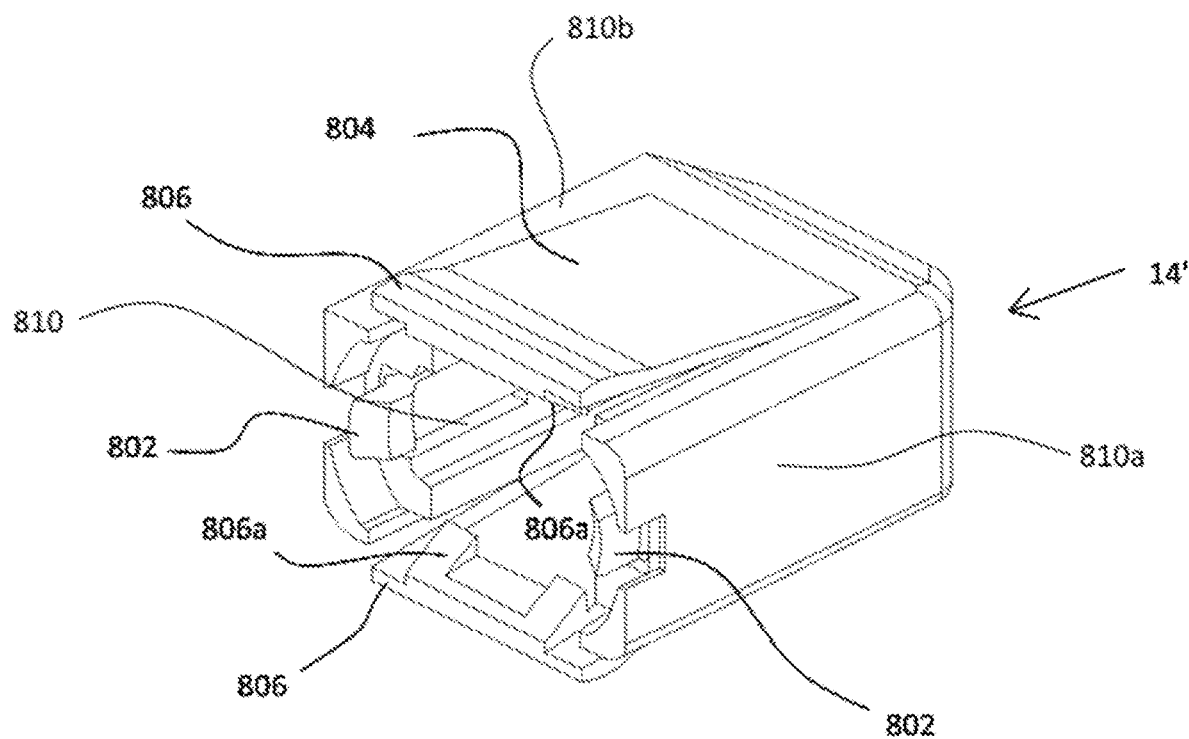
FIG. 5B is rear perspective view of the retainer dust cap of FIG. 5A.

FIGS. 5A and 5B, show another embodiment of a retainer dust cap 14' for use in a lanyard organizing tool 10 of the present disclosure, with such retainer dust cap 14' being a potential substitute for, for example, the retainer dust caps 14 shown in FIG. 1. In the retainer dust cap 14' of FIGS. 5A and 5B, the entire retainer dust cap 14' may be provided in integrated form, without separate parts for assembly. For example, the integrated retainer dust cap 14' may be formed in once piece, for receiving a connector 22 in the opening 810, between sidewalls 810a, 810b, with the retainer dust cap 14' being attached to a chord 12 via retainer member 14a', which may be a slot or aperture through which a chord 12 is passed to retain the retainer dust cap 14' on a chord 12 to form the organizing tool.

The integrated retainer dust cap 14' has a connector release component 804 formed on each of a top and bottom of the retainer dust cap 14', so that a pair of connector release components 804 is provided (e.g., the retainer dust cap 14' may be symmetrical about a center axis with upper and lower portions, and left and right structural portions, being symmetrically formed, similar to the retainer dust cap 14 previously described), and each of the connector release components 804 may include a wedge portion 806 formed near the opening 810 of the retainer dust cap 14'. Each wedge portion 806 may include a sloped acting surface 806a, which can be inwardly forwardly sloped, similar to the sloped acting surface 306a of the retainer dust cap 14, again, to act on a forward edge 202a of the housing 202 of the connector 22. That is, like the retainer dust cap 14, the connecter release component 804 may be resilient and have spring or elastic characteristic to resume its original form (e.g., resting state) after a manual compression force is released.

Figure 5C:
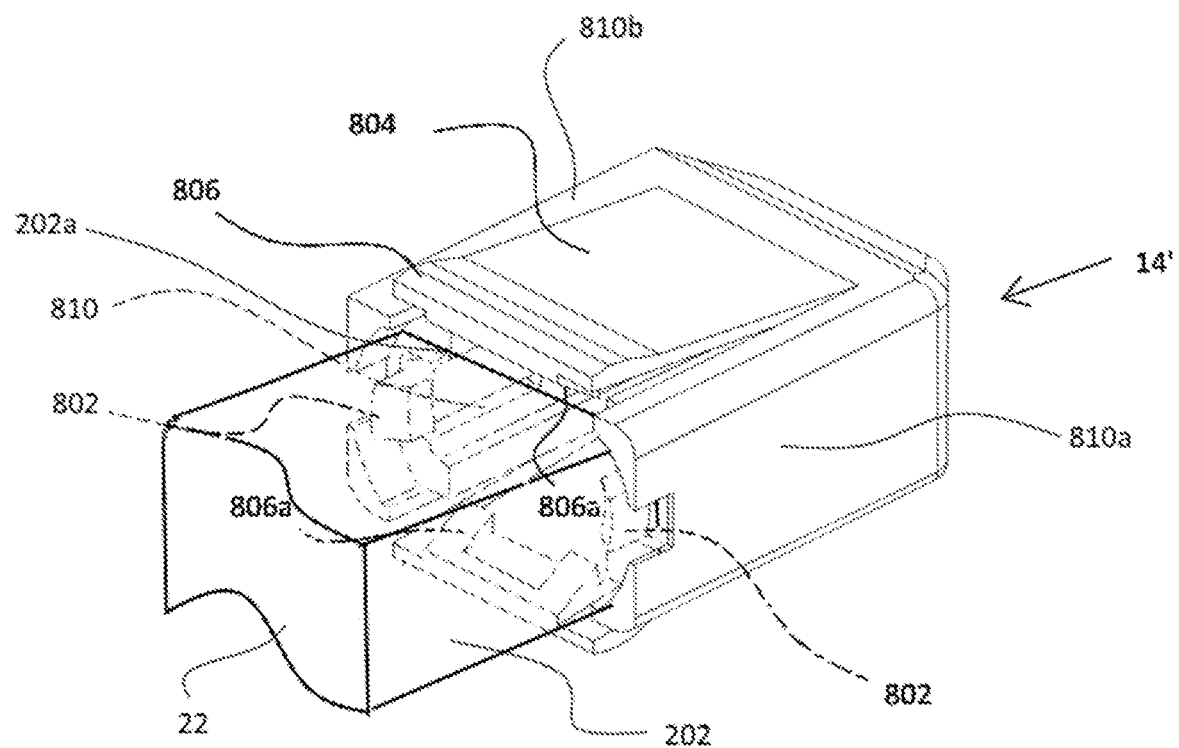
FIG. 5C shows the retainer dust cap of FIG. 5B, as connected to a prior art terminating connector 22, which is connected to a cable (not shown).

Therefore, in a resting state, when the retainer dust cap 14' has been connected to a connector 22, as shown in FIGS. 5A, 5B, and 5C (showing only a housing portion 202 of the connected connector 22), the wedge portion 806 and sloped acting surface 806a, rests proximate a forward edge 202a, of a connector housing 202, for a connector 22 that is connected to the retainer dust cap 14' (similar to that shown in FIG. 3B), via the locking components 802 of the retainer dust cap 14' being held within the notches 206 of the connector 22 (similar to that described previously for retainer dust cap 14). When a user applies manual force, by, for example, squeezing the retainer dust cap 14' between the user's thumb and a finger, placed on respective upper and lower connector release components 804, the respective upper and lower connector release components 804 can bend inward, and wedge portions 806 can be displaced inward so that the respective sloped acting surfaces 806a push rearward against the housing 202 to displace the housing 202 rearward against a biasing member in the connector 22 (as will be appreciated by those skilled in the art upon reviewing this disclosure). This in turn, will expose locking components 802, so that they can be released by being bent outward from the notches 206, and to further push the housing rearward so that the entire connector 22 may release from the retainer dust cap 14'.

Various embodiments in this disclosure are described in the context of fiber optic systems. However, as will be understood by those skilled in the art after reviewing this disclosure, the embodiments may be suitable for use in other environments and may be modified in the spirit of this disclosure to accommodate those environments.

The various embodiments described herein, are presented as non-limiting example embodiments of the present disclosure, unless otherwise expressly indicated. After reviewing the present disclosure, an individual of ordinary skill in the art will immediately appreciate that some details and features can be added, removed and/or changed without deviating from the spirit of the disclosure. Reference throughout this specification to "various embodiments," "one embodiment," "an embodiment," "additional embodiment(s)", "alternative embodiments," or "some embodiments," means that a particular feature, structure or characteristic described in connection with the embodiment(s) is included in at least one or some embodiment(s), but not necessarily all embodiments, such that the references do not necessarily refer to the same embodiment(s). Furthermore, the particular features, structures, or characteristics may be combined in any suitable manner in one or more embodiments. These and other changes can be made to the embodiments in light of the above-detailed description. In general, in the following claims, the terms used should not be construed to limit the claims to the specific embodiments disclosed in the specification, but should be construed to include all possible embodiments along with the full scope of equivalents to which such claims are entitled. Accordingly, the claims are not limited by the disclosure.

What is claimed is:

1. A lanyard organizing tool for organizing fiber optic cables, comprising: a chord member; a plurality of retainer dust caps attached to the chord member, the retainer dust caps each being releasably connectable to a terminating connector for a fiber optic cable; wherein the plurality of retainer dust caps each includes an aperture through which the chord member is passed; and wherein each of the retainer dust caps includes a release component accessible on opposite sides of the retainer dust cap, or at least a pair of release components with one release component of the at least a pair of release components being provided on each of opposite sides of the retainer dust cap, the release component or the pair of release components being resilient and compressible, whereby a user can squeeze the release component or squeeze the at least a pair of the release components simultaneously on opposite sides of the retainer dust cap, to release a corresponding terminating connector releasably connected to the retainer dust cap.

2. The lanyard organizing tool of claim 1 wherein the release component, or the at least a pair of release components, includes at least one wedge member having a sloped acting surface configured to exert a rearward force component against a housing of the corresponding terminating connector releasably connected to the retainer dust cap when the release component, or the at least a pair of release components, is compressed.

3. The lanyard organizing tool of claim 1 wherein the release component, or the at least a pair of release components, includes at least one wedge member having a sloped acting surface that his inwardly forwardly sloped.

4. The lanyard organizing tool of claim 1, wherein the release component, or the at least a pair of release components, is configured such that a sloped acting surface is displaced inward and simultaneously exerts a rearward force component against a housing of the corresponding terminating connector releasably connected to the retainer dust cap when the release component, or the at least a pair of release components, is compressed inward.

5. The lanyard organizing tool of claim 1 wherein the terminating connector is at least one of an MPO, LC or SC connector.

6. The lanyard organizing tool of claim 1 wherein the chord comprises a looped portion.

7. A fiber optic cable assembly comprising: a plurality of fiber optic cables each being terminated by a terminating connector, with each of the terminating connectors being connected to a chord by a corresponding retaining member connected to the terminating connector; wherein the terminating connector is releasably connected to the corresponding retaining member and wherein the corresponding retaining member is formed on a corresponding retainer dust cap that is releasably connected to the terminating connector to cover a mating end of the terminating connector for protecting the terminating connector from contaminants or damage; a resilient release component disposed on opposite sides of the corresponding retainer dust cap, or at least a pair of resilient release components with one resilient release component of the at least a pair of resilient release components being disposed on each of opposite sides of the corresponding retainer dust cap; and a sloped acting surface disposed on a portion of the resilient release component, or on a portion of each of the at least a pair of resilient release components, for use in displacing a portion of the terminating connector when the resilient release component or the at least a pair of resilient release components is squeezed.

8. The fiber optic cable assembly of claim 7 wherein the sloped acting surface is inwardly forwardly sloped.

9. The fiber optic cable assembly of claim 7 wherein the portion of the terminating connector is a housing of the terminating connector.

* * * * *